July 1, 1924.
C. LE G. FORTESCUE
1,499,918
COMBINED PHASE CONVERTER AND FREQUENCY CHANGER
Filed Feb. 5, 1921
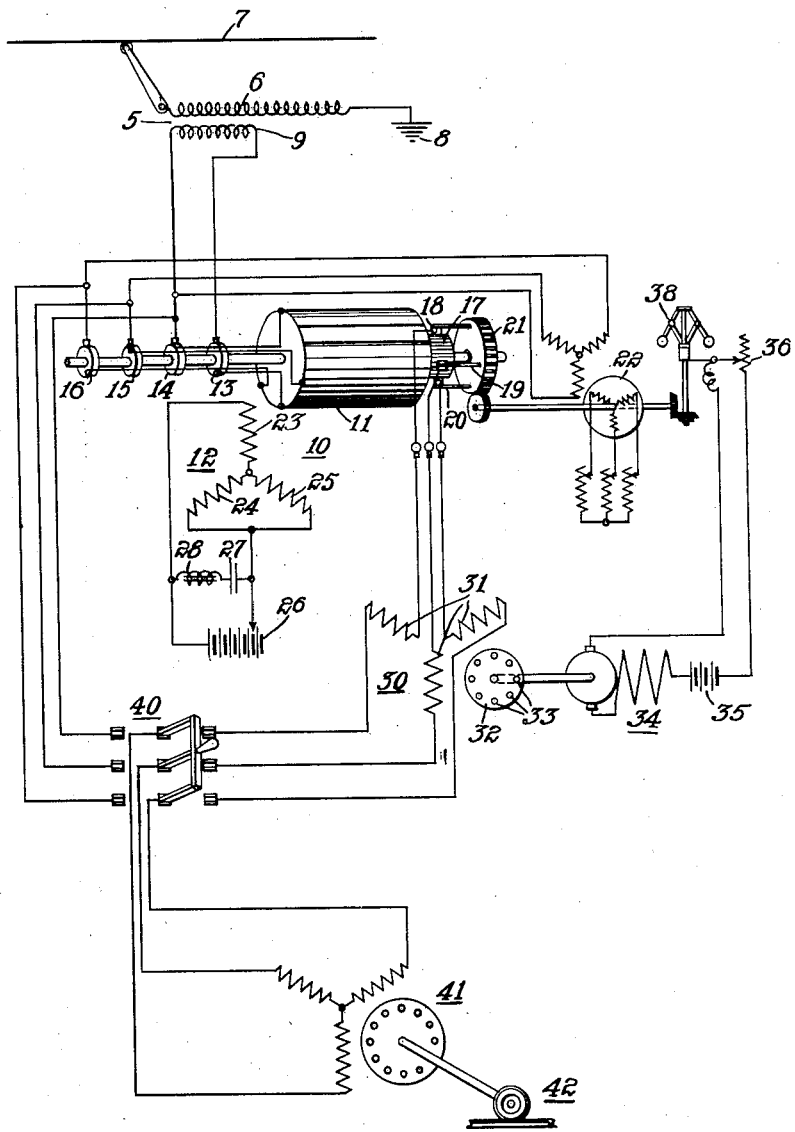
WITNESSES:
H. T. Shelhamer
O. B. Buchanan
INVENTOR
Charles Le G. Fortescue
BY
Wesley G. Carr
ATTORNEY Patented July 1, 1924.

1,499,918

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

COMBINED PHASE CONVERTER AND FREQUENCY CHANGER.

Application filed February 5, 1921. Serial No. 442,761.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Combined Phase Converters and Frequency Changers, of which the following is a specification.

My invention relates to a combined phase converter and frequency changer which is particularly adapted for accelerating induction motors.

One of the objects of my invention is to provide a system for converting from single-phase currents or unbalanced polyphase currents to balanced polyphase currents, with provision for varying the frequency of said balanced polyphase currents.

Another object of my invention is to provide a frequency changer in which the employment of resistance elements is avoided.

Still another object of my invention is to provide a combined phase converter and frequency changer which is capable of operating, at all times, at unity power-factor or at any other desired power-factor.

Other objects, as well as the details of my invention, will be apparent from the following description, when read in connection with the accompanying drawings.

The single figure of the drawings is a diagrammatic view of apparatus and connections embodying one form of my invention.

Single-phase power, or unbalanced polyphase power may be supplied by any means whatsoever. I have shown a single-phase transformer 5, the primary winding 6 of which derives energy from a trolley wire 7 and ground 8. The secondary winding 9 of the transformer supplies power to my converter system.

The combined phase converter and frequency changer is a dynamo-electric machine 10, similar to a rotary converter, said machine having a polyphase commutated primary member 11 and a secondary member 12. The primary winding may be connected, at diametrically opposite points, to slip rings 13 and 14, and, at three symmetrical points, to slip rings 14, 15 and 16.

The commutator cylinder 17 co-operates with brushes 18, 19 and 20, which are carried by a rotating system, such as a gear wheel 21. The speed of the revolving brushes is controlled by means of a motor 22, which is shown as a polyphase motor energized from the slip rings 14, 15 and 16.

The single-phase power which is supplied to the converter may be considered as an extreme case of unbalanced polyphase power and may be resolved into two oppositely-rotating balanced polyphase systems. In phase or frequency changing, as it is desired to utilize only the forwardly rotating system, it is necessary to provide the machine with a secondary member having good damper windings for damping out the double-frequency currents induced therein by the backwardly rotating system.

In the illustrated embodiment of my invention, I have indicated the secondary member 12 as having a single distributed, star-connected winding 23, 24, 25. Phase windings 24 and 25 are short-circuited and connected to phase winding 23 in series with a variable battery 26. If desired, the battery may be shunted by a condenser 27 or by a condenser 27 and an inductance 28 which may be tuned, if desired, to the double-frequency currents, in order to provide a low-impedance path therefor. This is particularly necessary in case a rheostat is used in connection with the variable battery 26. It is to be understood, of course, that the illustrated arrangement is only suggestive and that any unidirectional winding and any good damper winding could be used in lieu thereof.

When the brush system is stationary, the machine 10 operates as a rotary converter, and direct-current electromotive forces appear at the brushes 18, 19 and 20. When the brushes are revolved in the direction of the rotor member 11 of the main machine, polyphase alternating currents appear at the commutator brushes, said polyphase currents having a frequency proportional to the speed of the brushes. At synchronous speed, the brushes deliver polyphase currents of line frequency, and, at over-synchronous speed, the brushes deliver currents of a correspondingly higher frequency.

However, when polyphase power is supplied from a machine of the character described, negative-phase-sequence currents, which are small relatively to the load current, flow in the primary windings of the machine, by reason of the ohmic resistance of the rotor windings and the imperfect magnetic coupling between the rotor and the stator. Consequently, in spite of the good damper windings, small negative-phase-sequence electromotive forces appear at the rotating brushes having a frequency proportional to the line frequency plus the relative speed of the brushes.

If, desired, the negative-phase-sequence currents tending to flow in the leads connected to the brushes may be eliminated by means of a series balancer 30, such as is described in my copending application, Serial No. 258,578, filed October 17, 1918. The series balancer is an induction machine comprising a series-connected polyphase primary winding 31 and a secondary member 32 which has a good damper winding 33 and rotates backwardly at synchronous speed corresponding to the frequency of the negative-phase-sequence currents. The capacity of the series balancer 30 may be very small, as compared with that of the main machine 10, since the negative-phase-sequence electromotive forces are small.

The series balancer 30 tends to run by itself at the proper speed, provided it is once started in the backward direction. The series balancer may, therefore, be left to run by itself or it may be driven by a motor having approximately the correct speed adjustment to supply a substantially constant torque sufficient to overcome the frictional and other losses of the series balancer at all speeds at which it must run. By mechanical systems of gearing, which are well known in the art, I may drive the rotor of the series balancer at the proper speeds directly from the rotating brush system.

A more elaborate electrical scheme for driving the rotor of the series balancer is shown in the drawing. It is understood that the frequency of the negative-phase-sequence currents, which determine the speed of the series balancer, varies from twice the line frequency, when the brushes are at stand-still, to line frequency when the brushes are revolving at synchronous speed.

In the drawing, the rotor member 32 of the series balancer is shown as being mounted on the shaft of a series, direct-current motor 34, deriving energy from a battery 35. The speed of the motor 34 is controlled by a variable resistor 36, the effective portion of which is controlled by means of a speed governor 38, which is driven from the shaft of the motor 22. In this manner, the resistance of the element 36 is increased with an increase in the speed of the rotating brush system, thus decreasing the speed of the motor 34, as is desired.

When the above-described converter system is employed to control the speed of an induction motor or motors, as in locomotive service, it may be desirable to utilize the rotating brush system for accelerating purposes only, permanent running conditions being obtained by means of a double-throw switch 40, whereby the load may be transferred from the rotating brush system to the slip rings 14, 15, 16 when the brush system is rotating at synchronous speed. Under the last-mentioned conditions, the brushes may be lifted entirely away from the commutator cylinder 17, if desired. I have indicated the load as comprising a polyphase induction motor 41, driving a locomotive wheel 42.

The claims in this application are drawn to cover the phase and frequency converting machine 10, or the combination of this machine with two systems or translating devices having different phase numbers or frequencies. The system for controlling the speed of the induction motor 41, and combinations including the series balancer 30, are claimed in my co-pending application, Serial No. 556,859, filed April 27, 1922.

I have shown the main converter as having a rotating primary member and a stationary secondary member. It is, of course, understood, that this arrangement could be reversed. With a stationary primary winding and a stationary commutator cylinder, it will be necessary, of course, to revolve the commutator brushes at synchronous speed for zero frequency.

It is also to be understood that the direct-current exciting means for the converter 10 is not essential, since good balancing may be obtained with the machine running at any speed near synchronism, provided it has good damper windings. However, the direct-current excitation is very desirable for power-factor compensation, as well as for improving the balancing action.

The frequency-changing system herein described is particularly applicable for induction-motor control, such as is necessary in railway work, since the standstill torque of an induction motor, with any given primary current, is inversely proportional to the frequency. It is thus seen that I have provided, in a single constant-speed machine, a particularly advantageous means for accelerating the driving motors of locomotives, together with means for transferring the load to an ordinary phase-converter connection without frequency conversion.

While I have referred to a preferred embodiment of my invention, in order to illustrate the principles thereof, it is to be understood that numerous changes and modifications may be made by those skilled in the art without departing from the spirit and scope of the invention, as defined in the appended claims. I, therefore, desire that only such restrictions shall be placed upon my invention as are set forth in the claims, or are imposed by the prior art.

I claim as my invention:

1. The combination with two alternating-current systems, only one of which has substantially balanced polyphase power, of a constant-speed dynamo-electric machine having a polyaxially closed-circuit secondary winding and a polyphase primary winding, said primary winding being provided with both a commutator cylinder and slip rings and being connected between said alternating-current systems, whereby one of said systems derives energy from the other, and means comprising revoluble commutator brushes for independently controlling the frequency of said energy.

2. The combination with two alternating-current systems, only one of which has substantially balanced polyphase power, of a constant-speed dynamo-electric machine having a poly-axially closed-circuit secondary winding and a primary winding, said primary winding being provided with both a commutator cylinder and slip rings and being connected between said alternating-current systems, whereby one of said systems derives energy from the other, and means comprising revoluble commutator brushes for independently determining the frequency of said energy.

3. A combined phase converter and frequency changer, comprising a dynamo-electric machine having polyphase primary windings, a commutator cylinder connected to said primary windings, slip rings also connected to said primary windings for deriving both single-phase currents and polyphase currents, a secondary member including a good damper winding, and a rotatable brush system co-operating with said commutator cylinder.

In testimony whereof, I have hereunto subscribed my name this first day of February 1921.

CHARLES LE G. FORTESCUE.